United States Patent [19]
Cabrerizo-Pariente

[11] Patent Number: 5,682,966
[45] Date of Patent: Nov. 4, 1997

[54] REAR SHOCK ABSORBER FOR BICYCLES

[76] Inventor: Antonio Cabrerizo-Pariente, Pintor Ignacio Diaz de Olano, 11 bajo, 01008 Vitoria (Alava), Spain

[21] Appl. No.: 541,872

[22] Filed: Oct. 6, 1995

[30] Foreign Application Priority Data

Oct. 7, 1994 [ES] Spain ................... 9402561 U

[51] Int. Cl.⁶ ............................................. F16F 9/06
[52] U.S. Cl. .............................. 188/269; 267/64.28
[58] Field of Search .......................... 267/218, 64.12, 267/64.15, 64.28, 132, 140.13; 188/269, 300, 312, 313, 322.16, 322.17, 322.18, 322.21; 280/708, 276, 283, 284; 180/227

[56] References Cited

U.S. PATENT DOCUMENTS 2,564,790 8/1951 Orloff et al. ................ 267/64.28 X
3,762,514 10/1973 Freitag ............................ 188/300
4,442,926 4/1984 Muto ....................... 267/64.15 X

FOREIGN PATENT DOCUMENTS 9303359 12/1993 Spain .

*Primary Examiner*—Josie Ballato
*Attorney, Agent, or Firm*—Klauber & Jackson

[57] ABSTRACT

A shock absorber including a top tube-shaped body and a bottom tube-shaped body connected telescopically, wherein the bottom body has an oil cavity disposed above a gas cavity, the cavities being separated by a floating piston. An inside ram has a bottom portion, disposed in the oil cavity, and a center rod, upwardly extending from the bottom portion and fastened to the top body, so that movement of the top body is accompanied by the axial movement of the inside ram within the oil cavity. The shock absorber further includes a mechanical blocking system that optionally prevents relative axial movement between the top body and the bottom body.

4 Claims, 1 Drawing Sheet

REAR SHOCK ABSORBER FOR BICYCLES

OBJECT OF THE INVENTION

As expressed in the title of this specification, the present invention refers to a rear shock absorber for bicycles, especially for mountain bikes, allowing advantageous damping of the rear bicycle wheel, mainly in descents.

The shock absorber of the invention also includes a mechanical blocking system to eliminate the damping action when the bicyclist so desires.

This shock absorber has two chambers separated by a floating ram, said chambers being filled with different fluids, one with oil and the other with nitrogen gas.

BACKGROUND OF THE INVENTION

Presently some shock absorbing devices used in industry and especially in the automotive field are known. The purpose of all of them is to absorb the energy of the vibrations caused by the irregularities of the ground.

On the other hand there are shock absorbing devices for bicycles, which are comprised of steel or rubber springs, and also by a combination of steel springs and oil.

Hence, all dampings, in which mechanical elastic elements are used, the vibrations produced are not totally absorbed, then transmitting the same to the machine structure, or any other mechanism that includes shock absorbers. In the case of a bicycle, these vibrations will mainly be transmitted to the bicyclist's hands and arms which turns out to be somewhat uncomfortable.

On the other hand, the damped bicycle fork corresponding to Spanish Utility Model Application No. 9303359 includes some shock absorbers mainly provided with two independent chambers separated by a floating and shiftable ram, there being oil in one of the chambers, while the other one houses nitrogen gas.

DESCRIPTION OF THE INVENTION

The rear shock absorber for bicycles that constitutes the object of the invention, comprises two main cylindric-tube-shaped bodies connected together, a top one and a bottom one. The top body is made integral to an inside piston, which is capable of sliding inside the bottom body, inside of which two chambers separated by a floating ram are defined. One of them is filled with oil that contacts with the inside piston, while the other chamber is filled with nitrogen gas, the latter being limited, between the floating piston and a cover fastened to the bottom cylindric body.

The top body has an external thread to facilitate coupling of a middle part, which is in turn coupled to the fixed bar close to the bicycle seat. On the other hand, the cover includes a rotating ball joint that connects to the fork of the rear wheel of the corresponding bicycle. Said cover includes a nitrogen gas filling valve.

Hence, when the top body is pushed vertically downward by the action of force, the same moves downward drawing in its movement the inside piston, in such a way that part of the oil located in the chamber of the bottom body, will pass to the top part of said chamber through some small through holes belonging to the inside piston. At the same time that all of this happens, the floating piston will descend downward pushed by the pressure of the oil itself, whereby the volume of the nitrogen gas chamber will reduce and as a result the pressure inside the cited gas chamber will increase.

When the action of force no longer acts on the top body, the pressure of the nitrogen gas will push up all the elements that have previously descended, all of them tending to return to their initial position.

Of course this force which has been alluded to is caused by the weight of the bicyclist and more specifically to the irregularities of the ground on which the cited bicycle runs.

The shock absorber of the invention also has a totally effective mechanical blocking system.

Hereinafter to provide a better understanding of this specification and forming an integral part of the same, a single figure in which the object of the invention has been represented in an illustrative and non-restrictive manner is attached hereto.

DESCRIPTION OF THE PREFERRED EMBODIMENT

Figure 1:
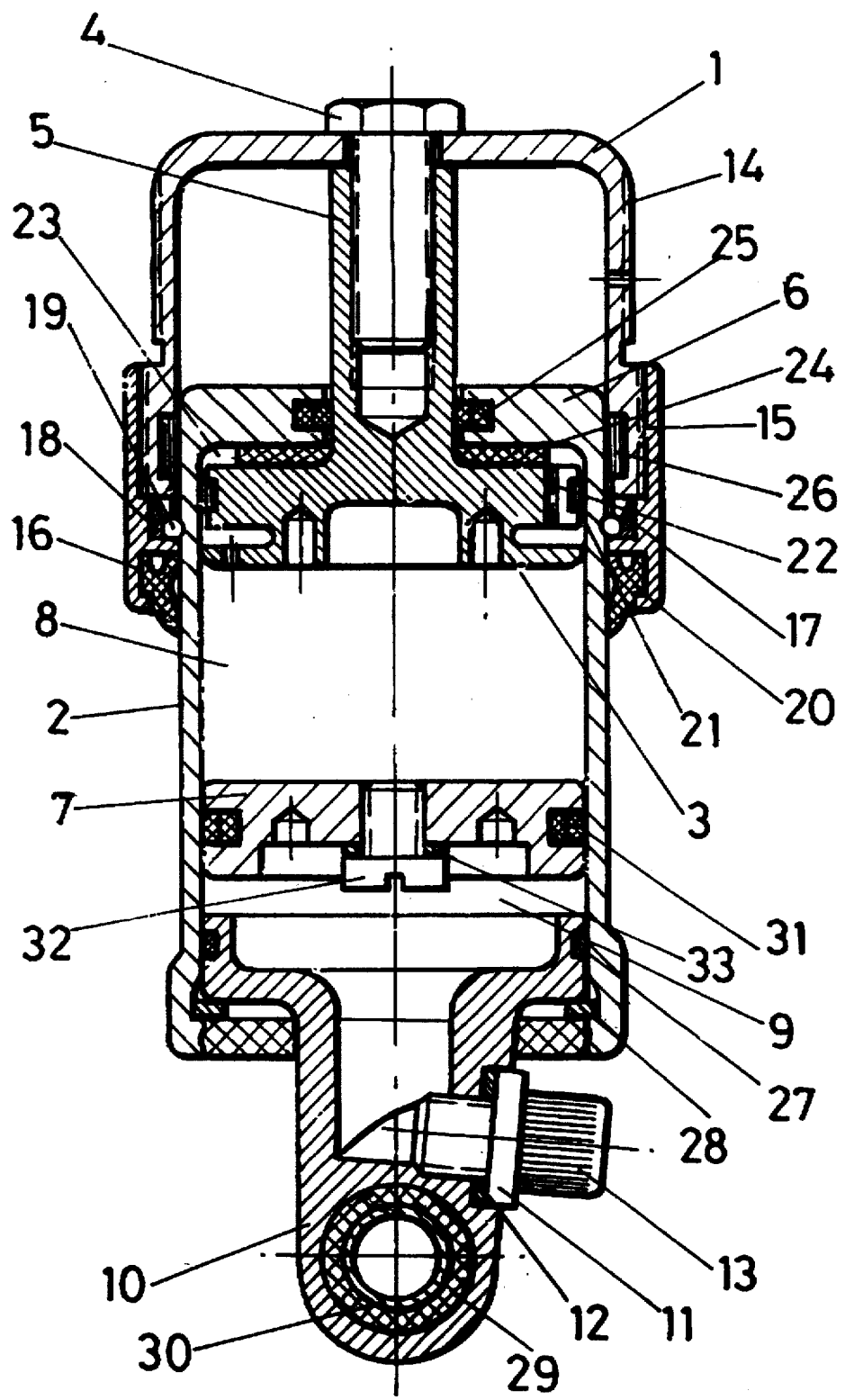
FIG. 1 is a raised sectioned view of the rear shock absorber for bicycles, object of the invention.

Referring to the numbering used in the FIGURE, the rear shock absorber for bicycles is comprised of a top cylindric-tube-shaped body (1), which is coupled externally and telescopically to a bottom body (2) which is also cylindric and tube-shaped, housing inside the same an inside piston (3), which is made integral to the top body (1) by means of a screw (4) that is screwed to a center rod (5) that forms part of the inside piston (3), said rod being guided in a hole in the top base (6) of the bottom body (2).

Inside the bottom body there is also a floating piston (7), which separates two chambers, a center one (8) filled with oil and another bottom one (9) filled with nitrogen gas, the latter closing by means of a cover (10) provided with a nitrogen gas filling valve (11); this valve sitting on a ring-shaped joint (12), at the same time that the valve has a sealing cap (13).

The top body (1) has in the top part thereof a thread (14) to facilitate the coupling of a part, which in turn is coupled to the fixed bar close to the bicycle seat.

On the other hand, the top body (1) has a second external bottom thread (15), that facilitates the connection of a mechanical blocking nut (16), the same including for this purpose a ring-shaped housing (17) where a tapered bush (18) related to a split ring (19) fit in a ring-shaped recess of the bottom body (2) adjusts. Hence, when the blocking nut (16) is tightened, the slanted surface of the tapered bush (18) will press on the split ring (19), whereby, movement of the top body (1) will be made impossible and therefore the movement of both rams, the inside one (3) and the floating one (7). The blocking nut (16) has close to its free edge a ring-shaped recess where a scraper (20) to clean the sliding surface of the bottom body (2) and to prevent particles from entering inside the shock absorber unit, is adjusted.

On the other hand, the inside piston (3) has a sealing gasket (21) that contacts against the inside wall of the bottom body (2) to facilitate movement of the cited inside piston (3), which also has some small through holes (22) to facilitate the flow of oil from the center chamber (8) to a top chamber (23) established between the inside piston itself (3) and the top base (6) of the bottom body (2), this flow of oil being produced when the top body (1) that will of course draw the inside piston (3) descends. Inserted between the inside piston and the inside surface of the top base (6) of the bottom body (2), a washer (24) made of soft material has been provided for in order to damp the reverse noise of the system.

The sealing of the oil between the inside piston (3) and the bottom body (2) is achieved by means of a special gasket (25) housed in a ring-shaped recess of the top base (6) of the bottom body (2), said special gasket contacting with the center integral rod (5) of the inside piston (3).

The top body (1) has a recess wherein a ring-shaped joint (26) that contacts with the outside surface of the bottom body (3) to facilitate movement of that body (1) fits.

The bottom body (2) closes in its bottom part with cover (10), which is provided with an O-ring seal (27) and fastens with an elastic (Seeger) ring (28) to prevent the covering from coming out. In the bottom outside part of the cover, a self-lubricated bush (29) mounted in a rubber or semiblock bush (30) which facilitates assembly on the rear fork of the bicycle, is housed.

The floating piston (7), that separates the center oil chamber (8) from the bottom gas chamber (9) is provided with a sealing gasket (31). The floating piston (7) is provided with a through hole which is normally plugged by a screw (32) and a washer (33), said screw being used to facilitate the purging of air in the oil.

With the described arrangement, when the top body (1) descends due to an external force, it draws in its movement the inside piston (3), at that same time that the floating piston (7) will descend downward, whereby the bottom nitrogen gas chamber (9) will reduce in volume, then increasing the pressure inside the same. At the same time that this all occurs, part of the oil will pass from the center chamber (8) to the top chamber (23) through the through holes (22) of the inside piston (3). When this external force on the top body (1) ceases, then the different elements will return to their initial position.

Finally, we must say that the shock absorber unit of the invention can be blocked, just as it has been described above.

I claim:

1. A rear shock absorber for use with a bicycle, said rear shock absorber comprising:

a top body (1) of a generally tubular shape;

a bottom body (2) of a generally tubular shape, said bottom body (2) having a substantially closed top end, a substantially closed bottom end, and an inner surface defining an inner cavity therebetween, said bottom body (2) including:

a top base (6) provided with a hole disposed therethrough, said top base forming said top end of said bottom body;

a sealing gasket (25) disposed in said hole in said top base (6), wherein said sealing gasket (25) is provided with a through hole;

a cover (10) forming said bottom end of said bottom body, said cover including:

a gas filling valve (11) in communication with said inner cavity; and an elastic ring (28) disposed between said cover (10) and said inner surface of said bottom body (2);

wherein said bottom body (2) is telescopically disposed within said top body (1);

an inside ram (3) disposed at least partially within said inner cavity, wherein said inside ram (3) includes:

a bottom portion disposed within said inner cavity, wherein said bottom portion is provided with at least one through hole (22);

a sealing gasket (21) disposed around said bottom portion for contacting said inner surface of said bottom body (2); and a center rod (5) integrally formed with said bottom portion and extending upwardly through said through hole in said sealing gasket (25);

means for attaching said center rod (5) to said top body (1);

a stop washer (24) disposed within said inner cavity of said bottom body (2) below said top base (6) and above said bottom portion of said inside ram (3), wherein said inside ram (3) and said top base (6) define a top chamber (23) therebetween;

a floating piston (7), including a sealing gasket (31) disposed therearound, wherein said floating piston (7) and said sealing gasket (31) are slidably disposed in said inner cavity below said inside ram (3);

wherein said inside ram (3) and said floating piston (7) define therebetween a center chamber (8);

wherein said center chamber (8) is in fluid communication with said top chamber (23) by said through hole (22) in said bottom portion of said inside ram (3);

wherein said floating piston (7) and said cover (10) define therebetween a gas chamber (9) in fluid communication with said gas filling valve (11);

mechanical blocking means for optionally preventing relative axial movement between said top body (1) and said bottom body (2); and means for connecting said rear shock absorber to said bicycle.

2. The rear shock absorber according to claim 1 wherein said top body (1) further comprises a substantially closed top end, an open bottom end having a free edge, and an outer surface having a ring-shaped recess; and wherein said mechanical blocking means further comprises:

a nut (16) threadedly attached to said free edge, said nut including a ring-shaped housing (17) and a tapered bush (18) having a slanted surface; and a split ring (19) adapted to fit around said ring-shaped recess;

wherein tightening said nut (16) causes said slanted surface to contact said split ring (19), thereby blocking relative movement between said top body and said bottom body.

3. The rear shock absorber according to claim 1 wherein said floating piston (7) is provided with a through hole to allow purging of air from said center chamber (8); and wherein said floating piston (7) further comprises a screw (32) adapted to plug said through hole in said floating piston (7).

4. The rear shock absorber according to claim 1 wherein said means for connecting said rear shock absorber to said bicycle further comprises:

a threaded portion disposed on said top body (1);

a self-lubricated bush (29) coupled to said cover (10); and a rubber or semi-block bush (30) disposed within said self-lubricated bush (29).

* * * * *